(12) United States Patent
Bindhammer

(10) Patent No.: US 11,256,227 B2
(45) Date of Patent: Feb. 22, 2022

(54) METHOD FOR CONTROLLING A POWER TOOL AND POWER TOOL CONFIGURED FOR CARRYING OUT THE METHOD

(71) Applicant: Scheppach Fabrikation von Holzbearbeitungsmaschinen GmbH, Ichenhausen (DE)

(72) Inventor: Markus Bindhammer, Friedberg (DE)

(73) Assignee: Scheppach Fabrikation von Holzbearbeitungsmaschinen GmbH, Ichenhausen (DE)

(*) Notice: Subject to any disclaimer, the term of this patent is extended or adjusted under 35 U.S.C. 154(b) by 331 days.

(21) Appl. No.: 16/558,153

(22) Filed: Sep. 1, 2019

(65) Prior Publication Data

US 2019/0384266 A1 Dec. 19, 2019

Related U.S. Application Data

(63) Continuation of application No. PCT/EP2017/025338, filed on Nov. 20, 2017.

(30) Foreign Application Priority Data

Mar. 10, 2017 (EP) .................................. 17020094

(51) Int. Cl.
*G05B 19/401* (2006.01)
*G05B 19/416* (2006.01)

(52) U.S. Cl.
CPC ....... *G05B 19/401* (2013.01); *G05B 19/4163* (2013.01); *G05B 2219/43146* (2013.01)

(58) Field of Classification Search
None
See application file for complete search history.

(56) References Cited

U.S. PATENT DOCUMENTS

| 4,928,254 A | 5/1990 | Knudsen et al. |
| 5,489,778 A | 2/1996 | Burmester et al. |

(Continued)

FOREIGN PATENT DOCUMENTS

| DE | 102008054701 A1 | 6/2010 |
| DE | 202013007344 U1 | 11/2013 |

(Continued)

OTHER PUBLICATIONS

Written Opinion of the European Patent Office in PCT/EP2017/025338 (from which this application claims priority) dated Sep. 10, 2019 and English-language translation thereof.

(Continued)

*Primary Examiner* — Sean Shechtman
(74) *Attorney, Agent, or Firm* — Falk Ewers; Ewers IP Law PLLC

(57) ABSTRACT

A method for controlling a power tool includes ascertaining a workpiece characteristic of the workpiece to be processed from previously acquired measured values, determining the workpiece material from the workpiece characteristic of the workpiece to be processed, specifying initial values, which are suitable for processing the workpiece made of the determined workpiece material using the power tool, for machine parameters such as feed, speed, and torque, storing the initial values for putting the power tool into operation with machine parameters set to the initial values and/or putting the power tool into operation with machine parameters set to the initial values. A cooling constant is ascertained according to the Newtonian cooling law as the workpiece characteristic of the workpiece to be processed. To ascertain the cooling constant, the ambient temperature is measured, the workpiece is heated, and the actual temperature of the workpiece is measured, whereupon the cooling constant is computed.

15 Claims, 1 Drawing Sheet

(56) References Cited

U.S. PATENT DOCUMENTS

| | | |
|---|---|---|
| 8,311,661 B2 | 11/2012 | Krapf et al. |
| 8,474,356 B2 | 7/2013 | Stellmann et al. |
| 8,935,000 B2 | 1/2015 | Krapf et al. |
| 2013/0156063 A1 | 6/2013 | Kim |
| 2014/0301424 A1 | 10/2014 | Adamczyk et al. |
| 2016/0016240 A1 | 1/2016 | Koegel |
| 2016/0033431 A1 | 2/2016 | Hatori et al. |

FOREIGN PATENT DOCUMENTS

| | | |
|---|---|---|
| EP | 2064480 A1 | 6/2009 |
| EP | 2073954 A1 | 7/2009 |
| EP | 2386383 A1 | 11/2011 |
| WO | 2008028868 A1 | 3/2008 |
| WO | 2008028871 A1 | 3/2008 |

OTHER PUBLICATIONS

International Search Report dated Apr. 10, 2019 of international application PCT/EP2017/025338 on which this application is based.

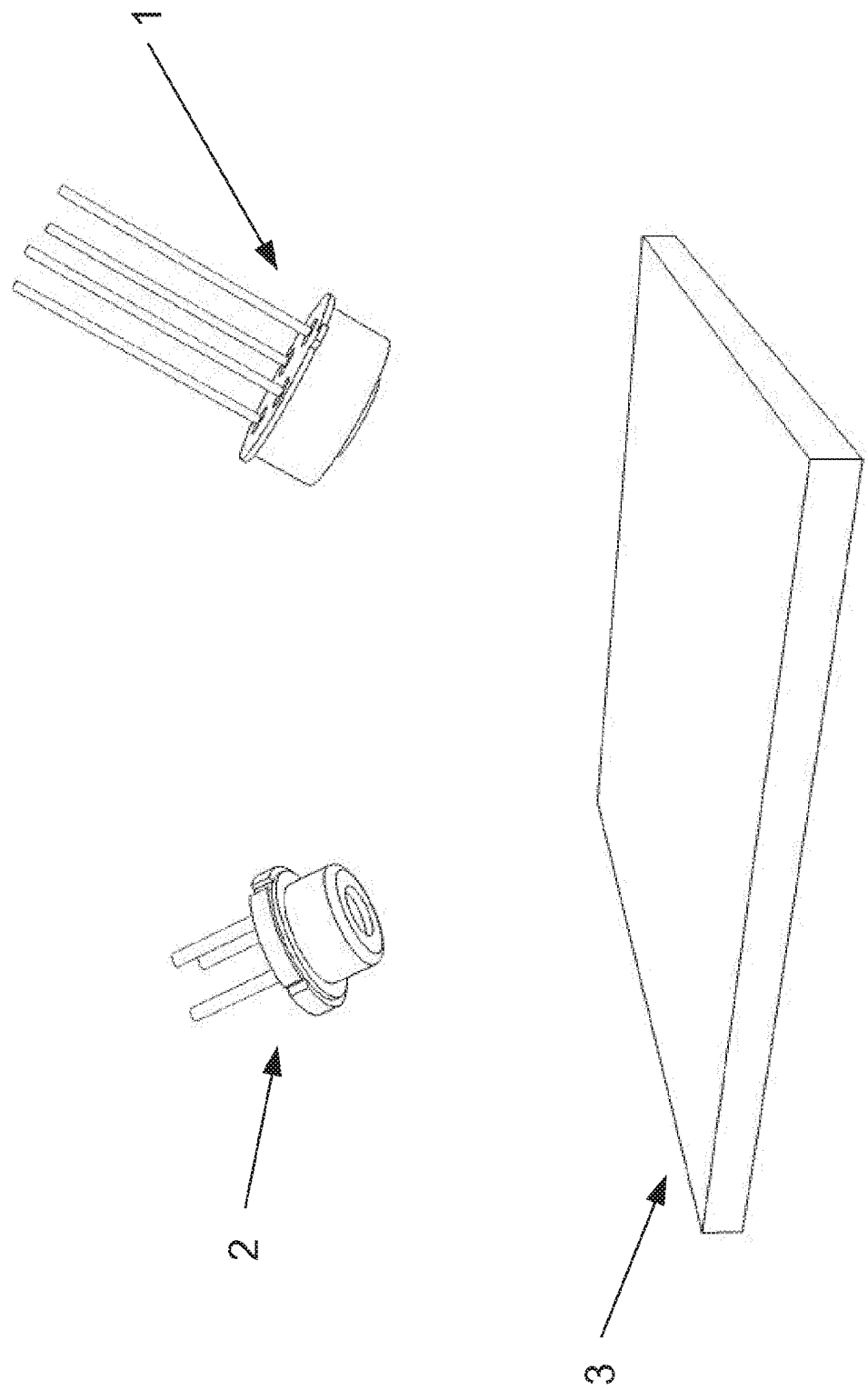

METHOD FOR CONTROLLING A POWER TOOL AND POWER TOOL CONFIGURED FOR CARRYING OUT THE METHOD

CROSS REFERENCE TO RELATED APPLICATIONS

This application is a continuation application of international patent application PCT/EP2017/025338, filed Nov. 20, 2017, designating the United States and claiming priority to European application EP 17 020 094.3, filed Mar. 10, 2017, and the entire content of both applications is incorporated herein by reference.

TECHNICAL FIELD

The invention relates to a method for controlling a power tool and to a power tool provided for this purpose.

BACKGROUND

In the scope of the present invention, a power tool means an electrically driven machine tool, for example, a handheld drill, a handheld circular saw or jigsaw or the like, or also stationary machine tools, for example, a circular table saw.

In such machine tools, it has already been proposed for reasons of safety that it be detected by means of sensors in the working region of the machine tool whether a limb of the machine operator is there, so that one can then react accordingly, for example, can stop the machine tool, to prevent serious accidents. Thus, European patent application EP 2 386 383 A1 discloses a machine tool monitoring device having a recognition unit for recognizing the presence of human tissue in a machine tool working region by means of the spectral analysis of optical radiation. Photodiodes acquire the reflection of LED infrared light. The detected response is then compared to values stored in a database, with each of which the information "human tissue there"/"not there" is associated.

European patent applications EP 2 073 954 A1 and EP 2 064 480 A1 have similar disclosures, wherein an ultra-broadband radar sensor is used instead of the photodiodes.

Further safety measures on machine tools, for example, circular saws, relate to the avoidance of accidents because of the overheating of the machining tool. Thus, the saw blades heat up during sawing due to the friction occurring in this case. Life-threatening cracks can arise when working with overheated saw blades. To avoid the overheating of the saw blade, it has therefore been proposed, for example, in German utility model specification DE 20 2013 007 344 U1 that the surface temperature of the saw blade be detected by means of infrared sensors and be taken as an input parameter for a tool controller, which controls the speed of the saw blade accordingly, for example.

Further safety measures are directed to recognizing whether a foreign body is contained in a workpiece to be processed, i.e., for example, a nail in a board to be sawed, see, for example, German patent application DE 10 2008 054 701 A1.

Different materials have different cooling constants, which can be ascertained, for example, according to the so-called laser flash analysis method. In addition to the cooling constant, different materials also each have different temperature conductivities and/or thermal conductivities. The use of the laser flash analysis method for ascertaining temperature conductivity and/or thermal conductivity is described, for example, in US patent documents US 2016/033431 A1, US 2014/3301424 A1, and U.S. Pat. No. 4,928,254 in different embodiments. US patent specification U.S. Pat. No. 5,489,778 A1 discloses a method for differentiating materials, wherein a laser is applied to these materials and then the thermal pulse response of the material is analyzed by means of corresponding sensors.

US patent application US 2016/0016240 A1 discloses a power tool, in which different workpiece properties, for example, the density of the workpiece, can be acquired by means of different sensors, to determine the workpiece material or to determine whether foreign bodies are located in the workpiece material, for example, nails in wood. In this case, for example, optic, acoustic, camera-based, capacitive, inductive, piezoelectric, thermal, or magnetic sensors and also ultrasonic or IR sensors or motion sensors come into consideration as the sensors.

SUMMARY

It is an object of the present invention to improve the operation of the power tool, and also to lengthen its service life and increase the operational safety.

This object is achieved by a control method for a power tool and by a power tool as described herein.

As noted, the invention relates to a power tool, for example, a drill, a miter saw, circular saw, or jigsaw, but in particular an electric tool designed as a handheld tool, which has at least one processing tool, for example, a drill bit, a saw blade, or a saw band and is suitable for processing tools made of different materials. Thus, for example, tools made of wood, metal, or plastic can be processed using a drill.

The control method according to the invention for the power tool is distinguished by the following steps:

Ascertaining the cooling constant of the workpiece to be processed from previously acquired measured values, determining the workpiece material from the ascertained cooling constant, specifying initial values, which are suitable for processing this workpiece using the power tool, for machine parameters such as feed, speed, and torque of the power tool, and storing the initial values for putting the power tool into operation with machine parameters set to the initial values and/or putting the power tool into operation with machine parameters set to the initial values. In the sense of a simple achievement of the object which is feasible with little effort, in this case, the ambient temperature is measured to ascertain the cooling constant or, if previously known, for example, it is specified, and furthermore the workpiece is heated in relation to the ambient temperature until a specified initial temperature is reached, and then, after passage of a duration to be defined and/or specified, the actual temperature of the workpiece is measured, preferably at a point on the workpiece at which the workpiece has previously been heated.

The cooling constant may then be computed in a simple manner according to the following formula:

$$k = \frac{1}{t} \cdot \ln\left(\frac{T_A - T_U}{T - T_U}\right),$$

wherein
t: is a defined point in time,
k: is a cooling constant,
$T_A$: is a temperature of the workpiece at a point in time t0=0,
$T_U$: is an ambient temperature, and T: is a temperature of the workpiece at the defined point in time t.

To heat the workpiece, the power tool can preferably have a laser beam source, in particular a laser diode, which is furthermore capable of emitting a punctiform laser beam onto the workpiece.

Of course, the control method can also comprise the subsequent processing step, in which the workpiece is processed using the power tool with machine parameters set to the initial values. The processing can either be performed in this case continuously with machine parameters set to the initial values or at least proceeding from machine parameters set to the initial values, wherein the value of the machine parameters could be re-adjustable in the work sequence, for example, in response to further input variables, for example, a temperature change of the processing tool of the workpiece or an acquired exceptional state, for example, the presence of human tissue in the processing region. The power tool according to the invention is accordingly configured to carry out the control method and accordingly has the software and hardware required for this purpose.

On the one hand, this can be a machine controller, which is configured to ascertain the cooling constant of the workpiece to be processed from previously acquired measured values, to determine the workpiece material from the ascertained cooling constant, to specify initial values, which are suitable for processing the workpiece made of the determined workpiece material using the power tool, for machine parameters such as feed, speed, and torque, and for storing the initial values for putting the power tool into operation with machine parameters set to the initial values and/or for putting the power tool into operation with machine parameters set to the initial values.

The machine controller can comprise for this purpose a microcontroller or a microprocessor having suitable data memories, on which corresponding control routines are stored. The machine controller can furthermore comprise a locally or remotely stored database, in which the cooling constants of specific materials are stored, so that upon the determination of the workpiece material from the ascertained cooling constant, the database can be accessed, for example, in the form of a lookup table, and/or the workpiece material associated with an ascertained cooling constant can be selected from the database.

The cooling constant is not solely defined by the workpiece material, so that theoretical workpieces of different materials could have the same cooling constant. In the present application, however, the number of the materials coming into consideration for the workpieces to be processed is strongly limited, on the one hand, specifically to very different materials (example of drill: brick, concrete, tile, metal, plastic, wood). On the other hand, the surface of the workpiece can be specified for standard cases. Thus, typical values of the cooling constant for materials coming into consideration can be stored in the lookup table, for example, which have previously been determined, for example, by measurement series on corresponding objects, for example, "tiled wall in interior". An algorithm can then access the lookup table after measuring the present cooling constant and search for the closest value, whereby the workpiece material results.

The machine controller can furthermore comprise a database having initial values for the machine parameters which are suitable for a specific material, so that specifying and/or presetting the power tool to these initial values can be performed by selecting the initial values from the corresponding database. Furthermore, an assignment of suitable initial values for values corresponding to different tool materials for the machine parameters for the cooling constant can be provided in database form as part of the machine controller, so that the method step of determining the workpiece material from the ascertained cooling constant and then specifying the initial values depending on the determined tool material can be performed in a correspondingly shortened manner and/or beforehand during the preparation of the corresponding database.

The database or the databases can be provided in a form which can subsequently be expanded, to be able to retrofit data sets for new materials. It would also be conceivable to provide a learning function for assuming machine parameter values used once in the case of a determined cooling constant.

Temperature values are advantageously acquired to ascertain the cooling constant, and furthermore preferably in a contactless manner. Accordingly, the power tool advantageously has at least one temperature sensor, furthermore preferably a temperature sensor operating in a contactless manner, for example, an infrared temperature sensor.

The temperature values to be acquired can naturally comprise workpiece temperature values in this case, since the cooling constant thereof is to be ascertained. In a modification of the invention, however, it would also be conceivable, additionally or alternatively to the cooling constant, to determine further temperature-dependent constants which define the workpiece material, for example, the thermal conductivity or temperature conductivity from the temperature values. It would thus be conceivable, for example, to acquire the temperature on a workpiece heated in a punctiform manner and, at a point spaced apart by a known spacing from the heating point, to acquire the temperature resulting after a specific time, to thus determine the temperature conductivity of the workpiece, or to derive its cooling constant therefrom.

If the IR temperature sensor used is configured to measure its own temperature, i.e., the sensor temperature, this can thus be used as the value for the ambient temperature $T_U$, while in contrast the actual temperature T after the passage of the time t and the initial temperature $T_A$ can be measured on the workpiece. The heating of the workpiece is advantageously carried out in this case so that the workpiece is not damaged. The desired initial temperature $T_A$ is thus to be below a temperature at which the workpiece suffers damage. In this case, while the workpiece is heated, it is advantageously continuously acquired whether the desired initial temperature $T_A$ is reached, for which purpose the temperature sensor is advantageously furthermore used. However, it would also be conceivable to specify a specific warming time and then to measure the initial temperature.

To prevent damage to the IR temperature sensor or influencing of the measured values by reflected laser radiation, the temperature sensor and the laser source are furthermore preferably actuated so that, in particular by means of pulse width modulation, they are never in operation simultaneously, but rather alternately or in succession.

To simplify the use of the newly proposed control method in particular for a handheld tool, in this case, the temperature sensor and/or the laser radiation source is attached at or on the power tool so that it is/are oriented on a point located in front of the processing tool in the processing direction of the processing tool. The power tool is then advantageously aligned by the user in the direction toward the workpiece to be processed using his processing tool, i.e., with his processing tool in the provided processing direction, wherein the heating of the workpiece by means of the laser beam source and the workpiece temperature measurements by means of the temperature sensor can be performed in the same action.

To increase the accuracy of the material determination, further material properties of the workpiece can be measured and/or ascertained from measurements, for example, the reflection of laser radiation or also other radiation emitted onto the workpiece, for example, visible light or thermal radiation in a specific frequency range and/or phase shifts in the case of reflected radiation, etc. Furthermore, in addition to the material properties, further properties of the workpiece can also be used for presetting the machine parameters, for example, dimensions such as the tool thickness in the case of sawing, the length of the cut to be carried out, etc. Furthermore, of course, specified or preset machine parameters can also be incorporated into the presetting of the initial values of the settable machine parameters. Specified machine parameters could be, for example, the type of the processing tool (for example, masonry drill, wood drill, or metal drill) or the type of the cooling, etc.

BRIEF DESCRIPTION OF THE DRAWINGS

The invention will now be described with reference to the drawing wherein:

FIG. 1 shows a schematic sketch of the tool sensor system on a workpiece to be processed.

DESCRIPTION OF EXEMPLARY EMBODIMENTS

The Newtonian cooling law reads as follows in its notation according to solved differential equation $$k = \frac{1}{t} \cdot \ln\left(\frac{T_A - T_U}{T - T_U}\right),$$

wherein
t: is a defined point in time,
k: is a cooling constant,
$T_A$: is a temperature of the workpiece at a point in time $t_0=0$,
$T_U$: is an ambient temperature, and
T: is a temperature of the workpiece at the defined point in time t.

In the scope of the invention, an arrangement and/or method is proposed to determine the cooling constant of a body or workpiece in a contactless manner and to determine therefrom the material of which the workpiece consists. For this purpose, firstly the ambient temperature is measured by an IR temperature sensor 1. It is assumed for this purpose that the sensor temperature per se is equal to the ambient temperature $T_U$. The IR temperature sensor 1 is capable both of determining its sensor temperature and also the temperature of another object which is not in contact with the sensor. A punctiform laser beam is oriented by a laser diode 2 onto a workpiece 3 to be determined, in order to heat it. The IR temperature sensor 1 measures in this case the temperature of the workpiece.

To prevent damage to the IR temperature sensor 1 or influencing of the measured values by reflected laser radiation, the laser diode 2 and the IR temperature sensor 1 are actuated via pulse width modulation, inter alia, i.e., the laser diode 2 and the IR temperature sensor 1 are never simultaneously in operation, but rather always only in succession. If the desired initial temperature $T_A$ is reached, which naturally has to be below a temperature which damages a spot of the workpiece 3 in a punctiform manner, the laser diode 2 is turned off and the temperature T of the workpiece 3 is repeatedly measured after a defined time span t by the IR temperature sensor 1.

A microcontroller or microprocessor, which forms at least a part of a machine controller, and via which the measured values of the IR temperature sensor 1 are acquired and stored and via which the IR temperature sensor 1 and the laser diode 2 are regulated, then computes the cooling constant k and, via an algorithm, in the simplest case a lookup table, the material of which the workpiece 3 consists.

The above-described material acquisition, which operates in a contactless manner, is implemented (not shown explicitly) in a power tool, predominantly in one which can process various materials and/or types of material, for example, a drill or a miter saw, circular saw, or jigsaw.

In use, the power tool is firstly moved by the user in the direction toward the workpiece 3 to be processed. The described temperature sensor 1 points in this case in the same direction as the processing tool of the power tool, for example, a drill bit or saw blade, as does the described laser diode 2. Both are accordingly attached at or on the power tool. The described contactless material sensor determines the material properties of the workpiece 3 to be processed, for example, whether the workpiece 3 to be processed is metal, wood, or rock. The power tool thus configures itself before the beginning of the processing of the workpiece 3 itself, i.e., for example, feed, speed, and torque of the processing tool of the power tool are adapted to the material properties of the workpiece 3 electronically or by corresponding actuators.

Alterations and modifications of the embodiment shown are possible without leaving the scope of the invention.

It is understood that the foregoing description is that of the preferred embodiments of the invention and that various changes and modifications may be made thereto without departing from the spirit and scope of the invention as defined in the appended claims.

What is claimed is:

1. A method for controlling a power tool comprising a drill, a miter saw, circular saw, or jigsaw, which has at least one processing tool comprising a drill bit or a saw blade for processing one or more workpieces made of different materials comprising wood, metal, or plastic, comprising the following steps:
ascertaining a workpiece characteristic of the workpiece to be processed from previously acquired measured values,
determining the workpiece material from the workpiece characteristic of the workpiece to be processed,
specifying initial values, which are suitable for processing the workpiece made of the determined workpiece material using the power tool, for machine parameters including feed, speed, and torque,
storing the initial values for putting the power tool into operation with machine parameters set to the initial values and/or putting the power tool into operation with machine parameters set to the initial values,
wherein a cooling constant is ascertained according to the Newtonian cooling law as the workpiece characteristic of the workpiece to be processed,
wherein, to ascertain the cooling constant, an ambient temperature is measured or specified, the workpiece is heated until a specified initial temperature is reached, and then, after passage of a specified duration, the actual temperature of the workpiece is measured, whereupon the cooling constant is computed, in particular according to the following formula:

$$k = \frac{1}{t} \cdot \ln\left(\frac{T_A - T_U}{T - T_U}\right),$$

wherein t: is a defined point in time, k: is a cooling constant, $T_A$: is a temperature of the workpiece at a point in time $t_0 = 0$, $T_U$: is an ambient temperature, and T: is a temperature of the workpiece at the defined point in time t; and subsequent processing of the workpiece using the power tool with machine parameters set to the initial values.

2. The method according to claim 1, wherein during subsequent processing of the workpiece using the power tool with machine parameters set to the initial values, the processing is either performed continuously with machine parameters set to the initial values or at least proceeding from machine parameters set to the initial values, which are re-adjustable in the course of work, however.

3. The method according to claim 1, wherein temperature values are acquired in a contactless manner to ascertain the cooling constant, wherein the workpiece is heated in a contactless manner, preferably by means of a laser beam source comprising a laser diode, until the specified initial temperature is reached.

4. The method according to claim 1, wherein, to determine the workpiece material, the ascertained cooling constant is compared to known and/or stored values for the cooling constants of workpieces made of different materials.

5. The method as recited in claim 3, wherein a laser flash analysis is carried out to ascertain the cooling constant, in particular by means of an IR temperature sensor operating in a contactless manner, which is used to measure its sensor temperature as the ambient temperature and the surface temperature of the workpiece, wherein a punctiform laser beam from the laser beam source, in particular the laser diode, is oriented on the workpiece to heat the workpiece.

6. The method as recited in claim 5, wherein, while the workpiece is heated, it is continuously acquired whether the specified initial temperature is reached, in particular using the temperature sensor comprising the IR temperature sensor.

7. The method according to claim 5, wherein the temperature sensor and the laser beam source are actuated via pulse width modulation, so that they are alternately in operation.

8. The method according to claim 1, wherein, when specifying the initial values for the machine parameters, further workpiece properties characterizing the workpiece comprising a workpiece thickness, are taken into consideration, wherein these workpiece properties are preferably also determined from at least one additional measured value acquired by means of at least one additional sensor.

9. The method according to claim 1, wherein, in the determination of the workpiece material, in addition to the cooling constant, supplementary workpiece material properties are also incorporated comprising a reflectivity in a specific wavelength spectrum, which is ascertained from at least one supplementary measured value acquired by means of at least one supplementary sensor.

10. A power tool comprising a drill, miter saw, circular saw, or jigsaw, having at least one processing tool comprising a drill bit or a saw blade for processing workpieces made of different materials comprising wood, metal, or plastic, wherein the power tool is configured to carry out the method according to claim 1.

11. The power tool according to claim 10, wherein a machine controller is configured to ascertain the cooling constant of the workpiece to be processed from previously acquired measured values, to determine the workpiece material from the ascertained cooling constant, to specify initial values, which are suitable for processing the workpiece made of the determined workpiece material using the power tool, for machine parameters including feed, speed, and torque, and to store the initial values for putting the power tool into operation with machine parameters set to the initial values and/or to put the power tool into operation with machine parameters set to the initial values.

12. The power tool according to claim 10, wherein an electronics unit and/or a number of actuators are configured to set the initial values.

13. The power tool according to claim 10, wherein at least one temperature sensor which operates in a contactless manner comprises an IR temperature sensor, which is suitable for measuring its sensor temperature and the surface temperature of the workpiece.

14. The power tool according to claim 13, wherein a laser beam source comprising a laser diode, is suitable for orienting a punctiform laser beam onto the workpiece.

15. The power tool according to claim 14, wherein the temperature sensor and/or the laser beam source is/are attached at or on the power tool so that it or they can be oriented or aligned onto a point located in front of the processing tool in the processing direction of the processing tool.

* * * * *